United States Patent
Lipiec et al.

(10) Patent No.: US 10,725,257 B2
(45) Date of Patent: Jul. 28, 2020

(54) FIBER OPTIC CABLE

(71) Applicant: Corning Optical Communications LLC, Hickory, NC (US)

(72) Inventors: Anna Lipiec, Lodz (PL); Katarzyna Synowiec, Borchowka (PL)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

(21) Appl. No.: 16/244,847

(22) Filed: Jan. 10, 2019

(65) Prior Publication Data

US 2019/0146171 A1 May 16, 2019

Related U.S. Application Data

(63) Continuation of application No. PCT/US2017/040805, filed on Jul. 6, 2017.

(30) Foreign Application Priority Data

Jul. 11, 2016 (EP) ..................... 16178806

(51) Int. Cl.
    *G02B 6/44* (2006.01)
    *C08F 10/00* (2006.01)
    (Continued)

(52) U.S. Cl.
    CPC ............ *G02B 6/4436* (2013.01); *C08F 10/00* (2013.01); *C08F 210/02* (2013.01);
    (Continued)

(58) Field of Classification Search
    CPC .. G02B 6/4436; G02B 6/4486; G02B 6/4434; G02B 6/4438; G02B 6/4464;
    (Continued)

(56) References Cited

U.S. PATENT DOCUMENTS

| 4,547,626 | A | * | 10/1985 | Pedersen | .............. | G02B 6/4416 |
| | | | | | | 174/107 |
| 6,671,441 | B1 | | 12/2003 | Bocanegra et al. | | |

(Continued)

FOREIGN PATENT DOCUMENTS

| CN | 203300303 U | 11/2013 |
|---|---|---|
| EP | 2163927 A1 | 3/2010 |
| WO | 2015102819 A1 | 7/2015 |
| WO | 2015142604 A1 | 9/2015 |

OTHER PUBLICATIONS

Draka Cableteq; Marine; Oil & Gas International; NEK606 Technical Data; (2006); 27 Pages http://www.cablejoints.co.uk/upload/Draka_NEK606_Cables__Marines,_Offsshore,_Oil_&_Gas_Cables__Technical_Manual.pdf.

(Continued)

*Primary Examiner* — Ellen E Kim
(74) *Attorney, Agent, or Firm* — William D. Doyle

(57) ABSTRACT

A fiber optic cable comprises a core subassembly, comprising at least one optical transmission element, wherein the optical transmission element comprises at least one optical fiber and a tube surrounding the at least one optical fiber. The fiber optic cable further comprises a jacket surrounding the core subassembly. The jacket is configured as a multi-layered jacket that comprises an inner layer comprising a first flame retardant material, an intermediate layer comprising a second flame retardant material being different from the first flame retardant material of the inner layer, and an outer layer comprising a non-flame retardant material having a lower coefficient of friction than the first and the second flame retardant material.

12 Claims, 2 Drawing Sheets

(51) Int. Cl.
    C08F 210/02    (2006.01)
    C08F 216/38    (2006.01)
    C08K 3/22      (2006.01)
    C08K 3/40      (2006.01)
    C09K 21/02     (2006.01)
    H01B 7/295     (2006.01)

(52) U.S. Cl.
    CPC .............. *C08F 216/38* (2013.01); *C08K 3/22* (2013.01); *C08K 3/40* (2013.01); *C09K 21/02* (2013.01); *G02B 6/4434* (2013.01); *G02B 6/4486* (2013.01); *C08K 2003/2224* (2013.01); *C08K 2003/2227* (2013.01); *G02B 6/4438* (2013.01); *G02B 6/4464* (2013.01); *G02B 6/4466* (2013.01); *H01B 7/295* (2013.01)

(58) Field of Classification Search
    CPC ...... G02B 6/4466; C08F 10/00; C08F 210/02; C08F 216/38; C08K 3/22; C08K 3/40; C08K 2003/2224; C08K 2003/2227; C09K 21/02; H01B 7/295
    See application file for complete search history.

(56) References Cited

U.S. PATENT DOCUMENTS

| | | | |
|---|---|---|---|
| 8,878,066 B2 * | 11/2014 | Galletti | ............... H01B 7/295 |
| | | | 174/120 R |
| 9,784,935 B2 | 10/2017 | Bringuier et al. | |
| 2012/0090874 A1 * | 4/2012 | Pagliuca | ............... B32B 5/16 |
| | | | 174/120 SR |
| 2015/0131952 A1 * | 5/2015 | Gallo | ............... G02B 6/4436 |
| | | | 385/102 |
| 2015/0268430 A1 | 9/2015 | Bringuier et al. | |

OTHER PUBLICATIONS

Fiber Optics: Machines & Materials Roundup; Wire and Cable Technology International Jul./Aug. 2015; 8 Pages.
International Search Report and Written Opinion of the International Searching Authority; PCT/US2017/040805; dated Sep. 22, 2017; 13 Pages; European Patent Office.
Melos, Cable Compound Finder; Downloaded Mar. 4, 2019; 2 Pages https://www.melos-gmbh.com/apps/ccfinder/bedding_compounds.html.
Nexans, Brings Energy to Life; Where Could Cables Take You?; 2018; 7 Pages http://www.nexans.com/eservice/Corporate-en/navigate_288508/Defensive_Armour_for_Cables.html.
Prysmian Group; Products and Solutions; (2019) 4 Pages http://www.prysmiangroup.com/en/business_markets/markets/oil-and-gas/downloads/Brochures/Catalogo_Offshore.pdf.
Tfkable; The Manufacture of Cables and Wires; (2016) 3 Pages; https://www.tfkable.com/sites/default/files/katalogi/kable_okretowe_v_ang.pdf.
Batt Cables; Fire Resistant Power Cable BS7846-F120 (Enhanced); 2 Pages; Date Unknown; http://www.batt.co.uk/upload/files/fireresistantpowercablebs7846f120enhanced_l389770722.pdf.
Chinese Patent Application No. 201780054460.4; English Translation of the Office Action dated Feb. 25, 2020; China Patent Office; 10 Pgs.

* cited by examiner

FIBER OPTIC CABLE

CROSS-REFERENCE TO RELATED APPLICATIONS

This application is a continuation of International Application No. PCT/US2017/040805 filed on Jul. 6, 2017 which claims the benefit of priority to European Patent Application No. 16178806.2 filed on Jul. 11, 2016, the content of each is relied upon and incorporated herein by reference in their entireties.

TECHNICAL FIELD

Aspects of the present disclosure relate generally to cables, such as fiber optic cables, that may support and carry optical fibers as well as other cable components.

BACKGROUND

Fiber optic cables, especially those in applications with strict fire and smoke regulations have to be designed to minimize the spread of fire, smoke, poisonous gases and other hazards related to fire. Often thick jackets of flame-retardant materials are used to meet the demand for these types of fiber optic cables. However, these types of cables are often intended for installation into ducts that depends on an installation method whereby the cable is blown or jetted into the duct.

Therefore, a cable, especially a cable jacket is needed that provides fire protection, particularly that passes international burn tests, such as IEC 60332-1-2 (single cable burn test), IEC61034 (smoke density), and IEC 60332-3-24 (bunch cable burn test). Furthermore, a cable, especially a cable jacket, is needed that has a sufficient mechanical and environmental strength and durability to withstand the stresses of installation, such as compression forces, impact and bending stresses, while providing a low coefficient of friction in order to provide the necessary blowing performance during installation.

It is desirable to provide a fiber optic cable that provides fire protection to pass international burn tests, and has the strength and durability to withstand mechanical stresses, and additionally provides a good blowing performance during installation into a duct. A further desire is to provide a multi-layered cable jacket that provides fire protection for cable components surrounded by the cable jacket and that has sufficient strength and durability to withstand mechanical stresses and provides the necessary blowing performance during installation into a duct. Another aim is to provide a method of manufacturing an optical cable that provides fire protection and has the strength and durability to withstand mechanical stresses and provides a good blowing performance during installation into a duct.

SUMMARY

An embodiment of a fiber optic cable providing fire protection, having mechanical and environmental strength to withstand mechanical stresses and having a good blowing performance for installation into a duct is specified in claim 1.

The fiber optic cable comprises a core subassembly and a jacket. The core subassembly comprises at least one optical transmission element. The optical transmission element comprises at least one optical fiber and a tube surrounding the at least one optical fiber. The jacket surrounds the core subassembly. The jacket comprises an inner layer comprising a first flame retardant material, and an intermediate layer comprising a second flame retardant material being different from the first flame retardant material of the inner layer, and an outer layer comprising a non-flame retardant material having a lower coefficient of friction than the first and the second flame retardant material.

An embodiment of a multi-layered cable jacket that provides fire protection and has sufficient strength and durability to withstand mechanical stresses and provides the necessary blowing performance for the cable during installation of the cable into a duct is specified in claim 13. The multi-layered cable jacket comprises an inner layer comprising a first flame retardant material, an intermediate layer comprising a second flame retardant material being different from the first flame retardant material of the inner layer, and an outer layer comprising a non-flame retardant material having a lower coefficient of friction than the first and the second flame retardant material.

A method of manufacturing an optical cable, wherein the manufactured cable provides good fire protection, has sufficient strength and durability to withstand mechanical stresses during installation of the cable and provides a necessary blowing performance during installation of the cable into a duct is specified in claim 17. The method comprises a step of providing a core subassembly, and a step of providing a multi-layered jacket around the core subassembly by one manufacturing step as tandem with co-extrusion method (which is the preferred one), or by manufacturing in two separate steps. The multi-layered jacket comprises an inner layer comprising a first flame retardant material and an intermediate layer comprising a second flame retardant material being different from the first flame retardant material of the inner layer, and an outer layer comprising a non-flame retardant material having a lower coefficient of friction than the first and the second flame retardant material.

The FRNC and LSZH materials of the inner layer and the intermediate layer of the cable jacket provide superior fire properties. In particular, the first flame retardant material has a higher flame resistance than the second flame retardant material. However, these materials do not necessarily provide low friction for blowing during installation or sufficient ultimate elongation to prevent cracking from handling and installation loads. The proposed outer layer 230, made to have a low coefficient of friction, improves the blowing performance and crack resistance of the cable.

The cable has excellent fire protection and mechanical performance. In particular, the cable passes international burn tests, such as IEC 61034 (smoke density test), IEC 60332-1-2 (single cable burn test) and IEC 60332-3-24 (bunch cable burn test). Regarding the mechanical properties, the cable has excellent crush, bend, impact, torsion, and kink performance. In the following some test scenarios are described that have been passed by the cable. The tests have been performed at room temperature (23+/−2° C.).

In particular, the cable passes a crush test using a plate length of 10 cm and a dwell time of 5 min at a maximum force of 1000 N. The cable shows a maximum attenuation change of less than 0.05 db using a wavelength at 1310 nm/1550 nm. Furthermore, the cable passes a bend performance test using a mandrel diameter of 160 mm and 5 turns. The maximum attenuation change at 1310 nm/1550 nm is less than 0.05 dB. The impact performance has been tested by using an energy of 3 J and a hammer radius of 10 mm.

The minimum distance between the impacts is 0.5 mm. The cable shows a maximum attenuation change of less than 0.05 dB at 1310 nm/1550 nm.

The torsion performance has been tested by applying a force of 50 N to a cable having a length of 1 m with a torsion angle of +/−360°. When using 5 cycles, the cable shows a maximum attenuation change at 1310 nm/1550 nm of less than 0.05 db. The kink performance has been tested with a cable having a minimum loop diameter of 50 mm. The minimum distance between the tests is 0.5 m. The cable showed a maximum attenuation of less than 0.05 db at 1310 nm/1550 nm.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Figure 1:
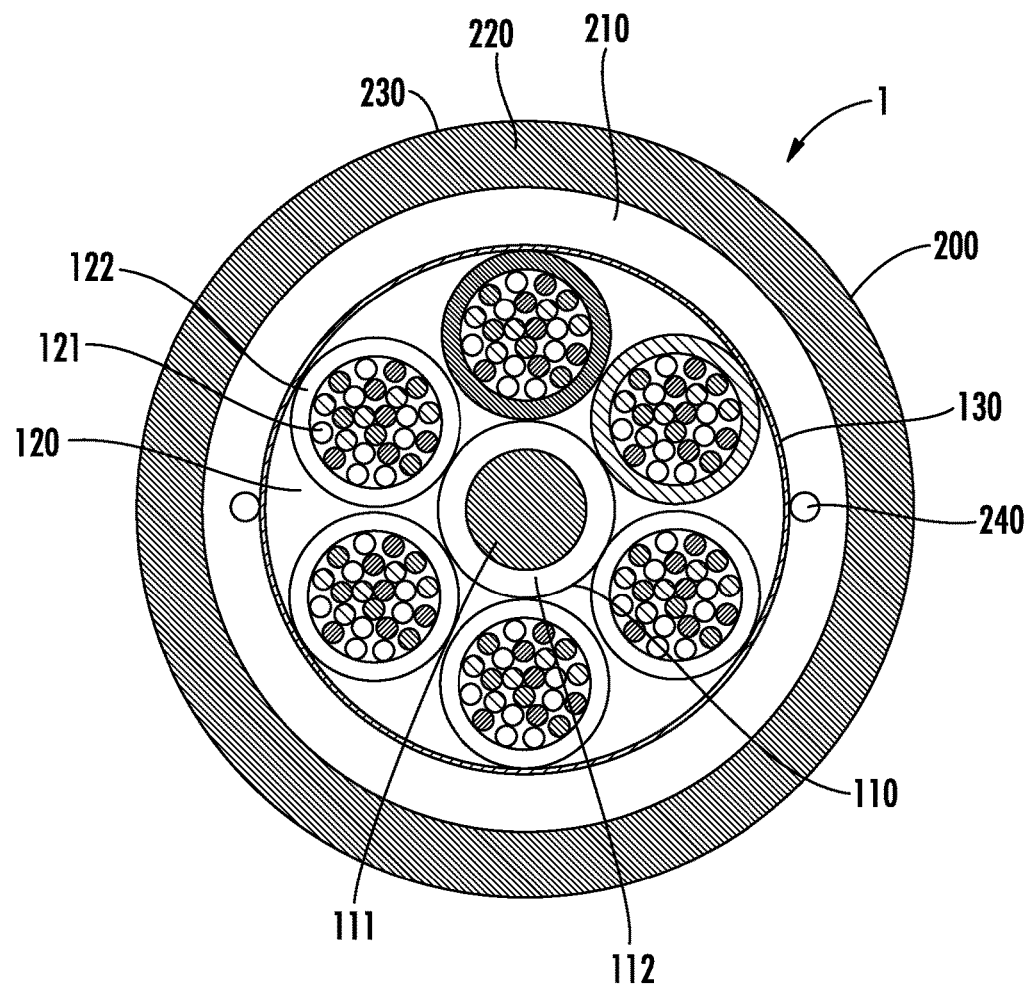
FIG. 1 shows a cross-sectional view of a fiber optic cable in accordance with aspects of the present disclosure.
Figure 2:
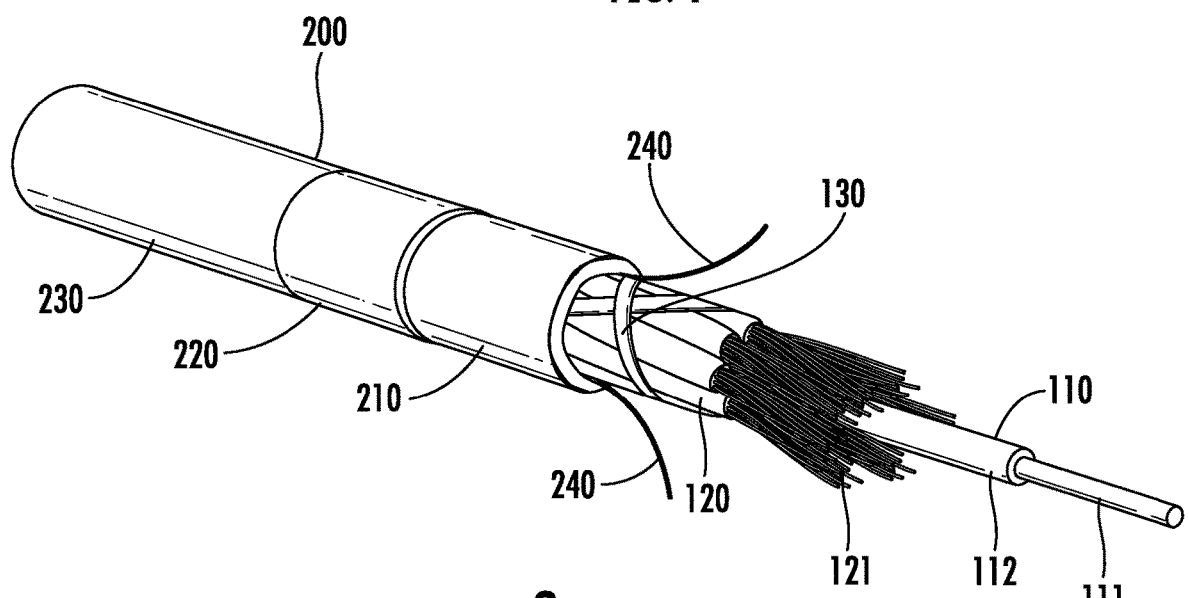
FIG. 2 is a perspective view of a fiber optic cable in accordance with aspects of the present disclosure.
Figure 3:
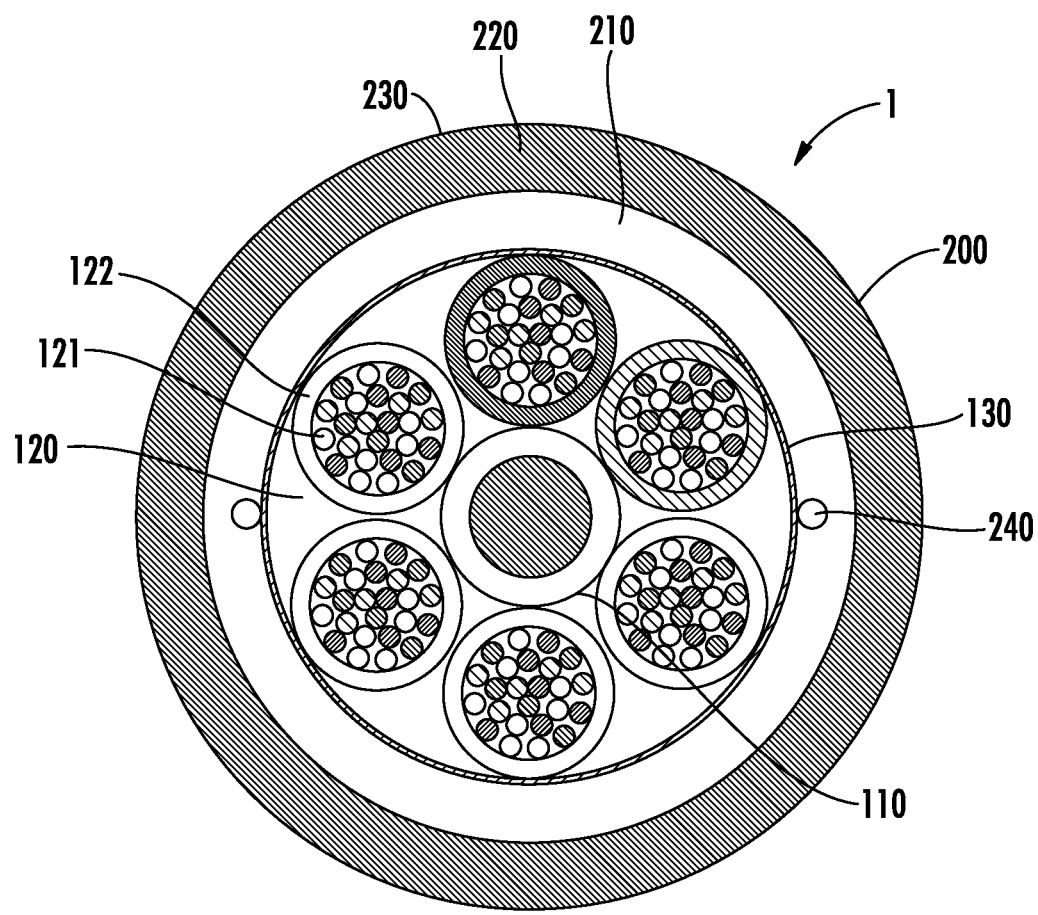
FIG. 3 is a cross-sectional view of another embodiment of a fiber optic cable in accordance with aspects of the present disclosure.

A cable in the form of a fiber optic cable 1 as shown in FIGS. 1, 2 and 3, may be an outside-plant loose tube cable, an indoor cable with fire-resistant/retardant properties, an indoor/outdoor cable, or another type of cable, such as a data center interconnect cable with micro-modules or a hybrid fiber optic cable including conductive elements. FIGS. 1 and 2 show a first embodiment of a fiber optic cable 1 in a cross-sectional view and a perspective view. FIG. 3 shows a second embodiment of a fiber optic cable 1 in a cross-sectional view. The first and second embodiment of the fiber optic cable differ in the embodiment of a central member 110, as explained below.

According to exemplary embodiments of the fiber optic cable 1 of FIGS. 1, 2 and 3, the fiber optic cable 1 includes a core subassembly 100 that is surrounded by a jacket 200. The core subassembly 100 comprises at least one optical transmission element 120. The optical transmission element 120 comprises at least one optical fiber 121 and a tube 122 surrounding the at least one optical fiber. The tube 122 may be configured as a buffer tube surrounding at least one optical fiber 121, a tight-buffer surrounding an optical fiber, or other tube. According to exemplary embodiments of the fiber optic cable, shown in FIGS. 1, 2 and 3, the core subassembly 100 comprises a plurality of tubes 122, for example six tubes. Each tube may contain 12, 24 or other numbers of optical fiber 121.

In some embodiments, the tubes 122 may include a water-blocking element, such as a gel, for example grease, petroleum-based gel, or an absorbent polymer, for example super-absorbent polymer particles or a powder. In some such embodiments, the tubes 122 may include at least one yarn carrying super-absorbent polymer. According to other possible embodiments, the tubes 122 may include super-absorbent polymer without a separate carrier, such as where the super-absorbent polymer is loose or attached to the interior walls of the tube. In some such embodiments, particles of super-absorbent polymer are partially embedded in walls of the tubes 122 or bonded thereto with an adhesive. The tubes 122 of the fiber optic cable 1 shown in FIGS. 1, 2 and 3 may have an outer diameter of 1.7 mm.

According to an exemplary embodiment, the at least one optical fiber 121 included in each of the tubes 122 is a glass optical fiber, having a fiber optic cable surrounded by a cladding. The optical fibers 121 included in the tubes 122 may be respectively configured as a single mode optical fiber in some embodiments, a multi-mode optical fiber in other embodiments, and a multi-core optical fiber in still other embodiments.

The core subassembly 100 of the fiber optic cable 1 may further comprise a central strength member 110 being arranged in the center of the core subassembly 100. As shown according to the embodiment of the fiber optic cable 1 of FIGS. 1 and 2, the central strength member 110 may include a center rod 111 and is up jacketed with a polymeric material 112, for example polyethylene with flame-retardant additive, polyvinylchloride with flame-retardant additive, low-smoke zero-halogen polymer. According to the embodiment of the fiber optic cable 1 shown in FIG. 3, the central strength member 110 is configured as a dielectric strength member, for example an up-jacketed glass-reinforced composite rod. In other embodiments, the central strength member 110 may be, or may include, a steel rod, a stranded steel, tensile yarn or fibers, for example bundled aramid, or other strengthening materials.

According to an exemplary embodiment of the fiber optic cable, water-blocking elements, for example yarns including a super-absorbent polymer and/or another powder or another water-absorbing component, for example particles of intumescent material, may be attached to the outer surface of the central strength member 110. According to a possible embodiment of the fiber optic cable 1, the intumescent particles may be formed from one or more intumescent materials that expands and forms char upon exposure to heat. The expansion of the intumescent material provides fire resistance by blocking air flow through the cable jacket, such as through interstices formed between the optical transmission elements 120 in the core subassembly. In addition, the char formation provides a layer material with low heat transfer characteristics. At least some of the powder particles may be partially embedded in the up jacket 112, and attached thereto by pneumatically spraying the particles against the up-jacket 112 while the up-jacket 112 is in a tacky and/or softened state.

The optical transmission elements 120 are stranded around the central strength member 110 in a pattern of stranding including reversals in lay direction of the optical transmission elements. The optical transmission elements 120 may be stranded in a repeating reverse-oscillatory pattern, such as so-called SZ stranding or other stranding patterns, for example helical. In other contemplated embodiments, the optical transmission elements 120 may be non-stranded. The optical transmission element are bound together around the central strength member 110 by a film or binder 130.

According to the embodiments of the fiber optic cable, shown in FIGS. 1, 2 and 3, the core subassembly 100 is surrounded by a multi-layered cable jacket 200. The jacket 200 comprises an inner layer 210 comprising a first flame-retardant material, an intermediate layer 220 and an outer layer 230. The intermediate layer 220 comprises a second flame-retardant material being different from the first flame-retardant material of the inner layer 210. The first flame retardant material of the inner layer 210 has a higher flame resistance than the second flame retardant material of the intermediate layer 220. The outer layer 230 of the cable jacket 200 comprises a non-flame-retardant material having a lower coefficient of friction than the flame-retardant materials of the inner layer 210 and the intermediate layer 220. Ripcords 240 in or adjoining the jacket 200 may be provided to facilitate opening the jacket.

As shown in the embodiments of the fiber optic cable of FIGS. 1, 2 and 3, the jacket 200 is configured as a multi-layered jacket comprising one or more highly filled LSZH (low smoke zero halogen) or FR (flame retardant) inner and intermediate layers and an unfilled or lightly filled outer layer 230, such as polyethylene. The inner layer 210 of the jacket 200 may comprise a base polymer and a flame-retardant filler. The base polymer of the inner layer 210 may have an amount less than 20% by weight. The flame-retardant filler of the inner layer 210 of the cable jacket 200 may have an amount higher than 80% by weight. According to an exemplified embodiment of the fiber optic cable of FIGS. 1, 2 and 3, the base polymer of the inner layer 210 of the jacket 200 may comprise a polyolefin elastomer. The flame-retardant filler of the inner layer 210 of the jacket 200 may comprise one of alumina trihydrate (ATH) and magnesium hydroxide (MDH) and a combination of alumina trihydrate and magnesium hydroxide.

The flame-retardant filler may be configured as a special designed combination of alumina trihydrate and magnesium hydroxide to cover a broader temperature range, for example having an amount of more than 80% by weight. The alumina trihydrate portion of the filler material enables to suppress a burn process in an early stage when the temperature is still low. When the alumina trihydrate is consumed, the magnesium hydroxide starts being active, and both components create strong char.

According to an exemplary embodiment of the fiber optic cable, FM 0474/5 from the manufacturer Melos, which is dedicated for XLPE insulation and HFFR sheathing may be used as a well-suited flame-retardant bedding compound/material in the inner layer 210. The bedding compound FM 0474/5 may be used as material for the inner layer 210 of the multi-layered jacket 200, because the material is very soft, easy to scratch and has very poor mechanical parameters, for example low elongation at break and tensile strength. The softness of the used bedding compound results from its chemical composition, especially from based polymer-rubber. The bedding compound may comprise more than 80% of an inorganic component, for example a flame-retardant filler, and less than 20% of an organic component, for example a polymer (rubber). Due to these kinds of combinations of components the bedding compound FM 0474/5 from Melos is very soft and thanks to that is well suited for filling the interstices/gaps between the optical transmission elements 120, to protect the cable core very well from fire.

The flame-retardant material of the inner layer 210 may be characterized by viscosity (Mooney viscosity), density, hardness and limiting oxygen index (LOI).

The parameter viscosity is the resistance of a polymer to flow. Most bedding compounds have a relative low viscosity, which is a predictor of processing efficiency. Measured at 100° C., typical values are from 20 MU to 50 MU. According to an exemplary embodiment of the fiber optic cable, a bedding compound with viscosity 32 MU may be used as material for the inner layer 210 of the cable jacket.

Density is defined as mass divided by volume, expressed as g/cm3. Density predicts overall weight of mass of a bedding application, and additionally can indicate the concentration of a filler, helping to predict how the bedding compound will behave under mechanical testing. According to an exemplary embodiment, the material used for the inner layer 210, for example the bedding compound FM 0474/5 from Melos, has a very high density of more than 1.8 g/cm3 and very poor mechanical properties, for example low elongation at break and tensile strength.

Hardness is a good indicator of mechanical strength and is defined as a resistance to penetration by a round or pointed object under a given load. Coilability and flexibility are reflected in hardness as well. Typical hardness of bedding compounds ranges from 50 to 80 durometer A hardness. The bedding compound FM 0474/5 from Melos that is preferably used for the inner layer 210 of the multi-layered cable jacket 200 has a hardness 74 Shore A measured according to ISO 7619-1.

The limiting oxygen index (LOI) describes the minimum oxygen concentration of an oxygen/nitrogen atmosphere needed to sustain a "candlelight" flame burning on a sample. It also indicates the degree of flame retardancy, with typical values ranging from 20% to 80% oxygen. According to an exemplary embodiment of the fiber optic cable using the bedding compound FM 0474/5 from Melos, the bedding compound has an LOI=63%.

The burn properties of the bedding compound FM 0474/5 from Melos has been checked by cone calorimetry measurements (with heat flux 50 kW/m2). The bedding compound FM 0474/5 from Melos has, for example, a Time to Ignition (TTI) of between 76 to 82 seconds, a Peak of Heat Release Rate (pkHRR) of 22 to 44 kW/m2, a Total Heat Evolved (THR) of about 3.0 MJ/m2, a Total Smoke Release (TSR) of between 65 to 100 m2/m2, a Specific Extension Coefficient (SEA) of between 30 to 130 m2/kg, a carbon monoxide yield of between 0.03 to 0.04 kg/kg and a carbon dioxide yield of between 0.13 to 0.21 kg/kg.

According to an exemplary embodiment of the fiber optic cable, shown in FIGS. 1, 2 and 3, the intermediate layer 220 of the multi-layered jacket 200 may comprise a base polymer and a flame-retardant filler. The base polymer of the intermediate layer 220 may have an amount less than 40% by weight. The flame-retardant filler of the intermediate layer 220 may have an amount higher than 60% by weight. According to a contemplated embodiment of the fiber optic cable, the base polymer of the intermediate layer 220 may comprise a copolymer EVA (Ethylene Vinyl Acetate copolymer). The flame-retardant filler of the intermediate layer 220 may comprise a mixture of alumina trihydrate (ATH) and some glass formers. According to an exemplary embodiment, the copolymer EVA may have an amount of less than 50% by weight, and the flame-retardant filler combination of alumina trihydrate and some glass formers may have an amount of more than 60% by weight.

According to a possible embodiment of the fiber optic cable 1, Conguard S 6650 S LDD UV from the manufacturer Condor Compounds may be used as a possible material for the intermediate layer 220 of the multi-layered cable jacket. Conguard S 6650 S LDD UV is a thermoplastic, halogen-free fire-retardant, low smoke and fume cable compound, designed to meet premium requirements on fire retardancy enabling cables in accordance with aspects of the present disclosure to meet the more stringent fire specifications as well as maintain a high degree of flexibility. The product contains a chemical UV protection agent as well as our Low Died Droll (LDD) package for fast extrusion and low died droll.

According to an exemplary embodiment of the fiber optic cable 1, as shown in FIGS. 1, 2 and 3, the outer jacket 230 of the multi-layered jacket 200 may comprise a polyethylene material. Exemplary materials for use in the outer layer 230 include a natural, UV-stabilized colorable, bimodal high density (HD) jacketing compound, such as HE6068 from the manufacturer Borealis, which is produced with a bimodal process technology. The technology in this type of material allows the manufacturing of polymers outside the traditional MFR and density range making it possible to optimize processability, reduce shrinkage while providing durability and environmental stress crack resistance (ESCR).

HE6068 contains a well-dispersed UV-stabilizer in sufficient amount to provide a measure of weathering resistance. HE6068 offers substantially reduced shrinkage of the outer layer 230 which helps to maintain low signal attenuation for optical fiber communication cables and low jacket retraction while providing the mechanical and barrier properties desired.

In particular, Borstar HE6068 from Borealis offers superior processability, excellent environmental stress cracking resistance (ESCR), excellent abrasion and scratch resistance, low water permeability, good petroleum-jelly resistance, a very good UV resistance and very low shrinkage. Furthermore, HE6068 has excellent surface hardness which is important from the perspective of blowing performance.

According to an exemplary embodiment of the fiber optic cable 1, as shown in FIGS. 1, 2 and 3, the average thickness of the inner layer 210 of the multi-layered jacket 200 is between 0.6 mm and 0.8 mm. It has been found that a nominal thickness of 0.6 mm for the inner layer/bedding compound 210 seems to be the minimum thickness which guarantees that the bunch cable burn test according to IEC 60332-3-24 is passed.

The average thickness of the intermediate layer 220 of the jacket 200 is between 0.4 mm and 0.6 mm. According to a contemplated embodiment, the thickness of the inner layer 210 of the multi-layered jacket 200 and the thickness of the intermediate layer 220 of the jacket 200 is in a relationships of 1:1. According to a possible embodiment of the fiber optic cable 1, the average thickness of the outer layer 230 of the multi-layered cable jacket 200 is equal or less than 100 microns, preferably in a range between 10 and 50 microns.

The size of miniducts into which the fiber optic cable 1 is blown, is one of the criteria which determines the outer cable diameter. According to an exemplary embodiment, the fiber optic cable 1 has an outer diameter of 7.8 mm which is suited for blowing the cable in a duct having an inner diameter of 10 mm and an outer diameter of 12 mm. Considering wall thickness limitation for the inner layer/bedding compound 210 and bearing in mind that the fiber optic cable needs to pass mechanical and environmental requirements, the nominal thickness of 0.6 mm for the intermediate layer 220 is a proper value which guarantees passing burn and mechanical requirements.

Due to the required burn performance of the fiber optic cable 1, the outer layer 230 is developed as a single layer in order to minimize the impact of the outer layer on the fire test results.

In accordance with aspects of the present disclosure, the thickness of the outer layer 240 may be 100 µm or less, which provides low surface friction for blowing performance. Practical verification shows that it is possible to get a skin outer layer with a thickness of even 10 µm. According to a contemplated embodiment of the fiber optic cable, a sufficiently thin outer skin layer 230, i.e. a layer as thin as 100 µm or less made with unfilled or lightly filled PE, or other such suitable material, has minimal effect on overall burn performance of the cable while providing low friction for enhanced blowing performance during installation.

According to a possible method of manufacturing the fiber optic cable 1, the core subassembly 100 is provided, and the multi-layered jacket 200 is provided around the core subassembly 100 by means of an extrusion process. According to a first embodiment, the extrusion process comprises at least two separate manufacturing steps. In a first step, the inner layer/bedding compound 210 is extruded over the core subassembly 100. Afterwards, in a second manufacturing step, the materials of the intermediate layer 220, i.e. a flame-retardant non-corrosive (FRNC) material, and the material of the outer layer, i.e. a high density polyethylene material (HDPE), are extruded over the inner layer/bedding compound 210.

Figure 4:
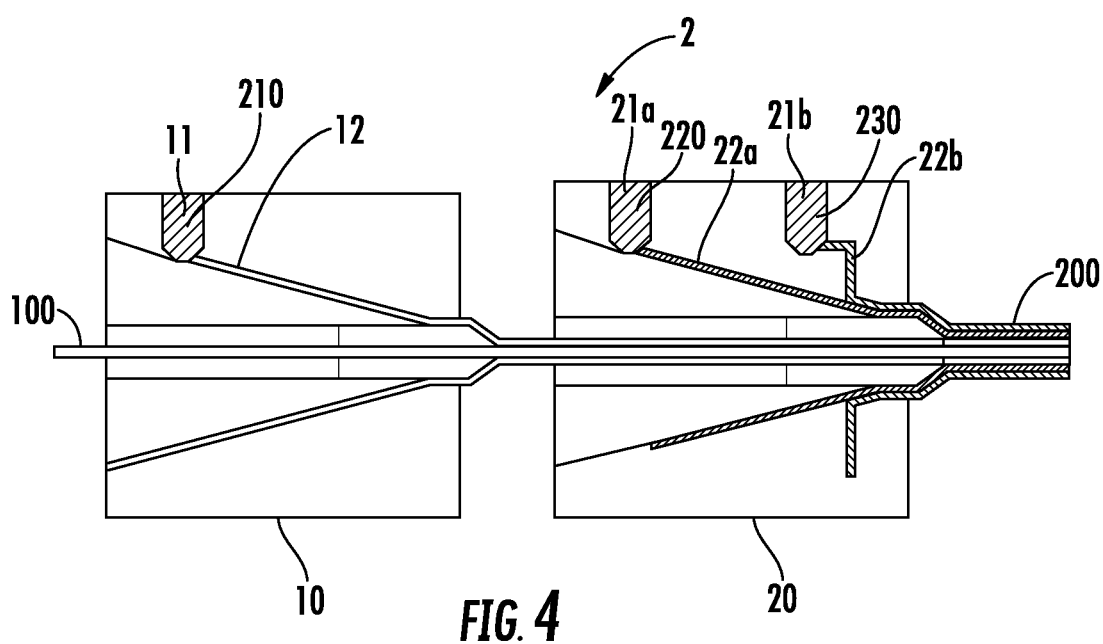
FIG. 4 shows a cross-sectional view of a production line for manufacturing a fiber optic cable having a multi-layered cable jacket in accordance with aspects of the present disclosure.

According to a second possible embodiment of the method for manufacturing the fiber optic cable 1, the multi-layered jacket 200 is provided around the core subassembly 100 by means of a tandem with co-extrusion process. FIG. 4 shows an embodiment of a tandem co-extrusion production line. The tandem co-extrusion production line outputs the multi-layered jacket 200 with high speed in one process. The tandem line is essentially two individual lines of extrusion in series. The extrusion lines are identical, except that the first line incorporates a single extruder 10, while the second line has co-extrusion capability by means of co-extruder 20.

Referring to FIG. 4, the tandem co-extrusion line comprises a first extruder 10 (for example, crosshead) including a tank 11 for providing a first extrudable polymer 210, for example the bedding compound FM 0474/5, and a flow path 12 to extrude the bedding compound 210 around the core subassembly 100. The production line further comprises a co-extruder 20 including a tank 21a for providing the polymer material of the intermediate layer 220, for example Conguard S6650S LDD UV, and a second tank 21b for providing the material of the outer layer 230, for example HDPE6068. The first tank 21a is connected to a flow path 22a and the second tank 21b is coupled to a flow path 22b. The extrusion paths 22a and 22b converge in the co-extruder 20 such that the second and third extrudable polymers 210, 220 are co-extruded in the extruder 20 over the inner layer/bedding compound 210.

Taking into account the bedding compound properties, especially of FM 0474/5, it is recommended to produce the fiber optic cable in one production step with the bedding compound extruded over the core subassembly and the FRNC material of the intermediate layer 220 and the HDPE material of the outer layer 230 co-extruded over the bedding compound. Due to the material properties, the recommended option is using a tandem with co-extrusion method, where the material applied from the first extruder 10 is the bedding compound 210, and the main FRNC material of the intermediate layer 220 and the HDPE material of the skin outer layer 230 is extruded by using the co-extrusion solution.

The tandem with co-extrusion method enables to get proper adhesion in between the main FRNC material of the intermediate layer 220 and the outer, skin layer 230 made with HDPE, to be sure that during cable installation by a blowing method, the outer surface will not be split up and the low coefficient of friction will be maintained during the entire installation process. Furthermore, the tandem with co-extrusion method allows to extrude at one time the bedding compound with the main FRNC material which is extruded over the bedding compound. This enables to protect the very soft surface made with the bedding compound.

The embodiments of the fiber optic cable shown in FIGS. 1 to 3 provide excellent flame-retardant properties and additionally proper mechanical and environmental characteristics, especially a low coefficient of friction so that it will be possible to install the fiber optic cable by using a blowing method. In particular, the bedding compound of the inner layer 210 of the jacket 200 provides fire protection. The flame-retardant material of the intermediate layer 220 gives the mechanical and environmental strength, and the outer HDPE material of the skin layer 230 provides the low coefficient of friction.

The fiber optic cable 1 complies with the requirements according to IEC 61034 (smoke density), IEC 60332-1-2 (single cable burn test) and IEC 60332-3-24 (bunch cable burn test). The cable has been tested according to EN 50399 and is classified according to EN 13501-6 as B2.

We claim:

1. A fiber optic cable, comprising:
a core subassembly, comprising
    at least one optical transmission element, wherein the optical transmission element comprises at least one optical fiber and a tube surrounding the at least one optical fiber; and
a jacket surrounding the core subassembly, wherein the jacket comprises:
    an inner layer comprising a first flame retardant material;
    an intermediate layer comprising a second flame retardant material, the second flame retardant material being different from the first flame retardant material, wherein the first flame retardant material has a higher flame resistance than the second flame retardant material; and
    an outer layer comprising a non-flame retardant material having a lower coefficient of friction than the first and the second flame retardant material.

2. The fiber optic cable of claim 1, wherein the inner layer of the jacket comprises a base polymer and a flame retardant filler.

3. The fiber optic cable of claim 2, wherein the base polymer of the inner layer of the jacket has an amount less than 20% by weight and the flame retardant filler of the inner layer of the jacket has an amount higher than 80% by weight.

4. The fiber optic cable of claim 2, wherein the base polymer of the inner layer of the jacket comprises a polyolefin elastomer and the flame retardant filler of the inner layer of the jacket comprises one of alumina trihydrate and magnesium hydroxide and a combination of alumina trihydrate and magnesium hydroxide.

5. The fiber optic cable of claim 1, wherein the intermediate layer of the jacket comprises a base polymer and a flame retardant filler.

6. The fiber optic cable of claim 5, wherein the base polymer of the intermediate layer of the jacket has an amount less than 40% by weight and the flame retardant filler of the intermediate layer has an amount higher than 60% by weight.

7. The fiber optic cable of claim 5, wherein the base polymer of the intermediate layer of the jacket comprises an ethylene-vinyl acetate elastomer and the flame retardant filler of the intermediate layer of the jacket comprises a mixture of alumina trihydrate and glass formers.

8. The fiber optic cable of claim 1, wherein the core subassembly further comprises a central strength member and a plurality of the at least one optical transmission element, wherein the optical transmission elements are stranded around the central strength member in a pattern of stranding including reversals in lay direction of the optical transmission elements.

9. A multi-layered cable jacket, comprising:
an inner layer comprising a first flame retardant material;
an intermediate layer comprising a second flame retardant material being different from the first flame retardant material of the inner layer; and
an outer layer comprising a non-flame retardant material having a lower coefficient of friction than the first and the second flame retardant material;
wherein the first flame retardant material has a higher flame resistance than the second flame retardant material.

10. The multi-layered cable jacket of claim 9, wherein the inner layer of the jacket comprises a base polymer having an amount less than 20% by weight and a flame retardant filler having an amount higher than 80% by weight; and wherein the intermediate layer of the jacket comprises a base polymer having an amount less than 40% by weight and a flame retardant filler having an amount higher than 60% by weight.

11. A method of manufacturing a fiber optic cable, comprising:
providing a core subassembly; and
providing a multi-layered jacket around the core subassembly by means of at least two separate manufacturing steps or by means of a tandem with co-extrusion method, wherein the multi-layered jacket comprises an inner layer comprising a first flame retardant material, and an intermediate layer comprising a second flame retardant material being different from the first flame retardant material of the inner layer, and an outer layer comprising a non-flame retardant material having a lower coefficient of friction than the first and the second flame retardant material, wherein the first flame retardant material has a higher flame resistance than the second flame retardant material.

12. The method of claim 11, wherein when using the two separate manufacturing steps, a material of the inner layer of the multi-layered jacket is extruded over the core subassembly during a first manufacturing step, and a material of the intermediate layer of the multi-layered jacket is extruded over the inner layer of the multi-layered jacket and a material of the outer layer of the multi-layered jacket is extruded over the intermediate layer of the multi-layered jacket during a subsequent second manufacturing step; and wherein, when using the tandem with co-extrusion method, a material of the inner layer of the multi-layered jacket is applied from a first extruder over the core subassembly and a respective material of the intermediate and outer layer is co-extruded over the material of the inner layer of the multi-layered jacket from a second extruder.

* * * * *